United States Patent
Hergenrother et al.

(10) Patent No.: US 6,713,541 B1
(45) Date of Patent: Mar. 30, 2004

(54) RUBBER COMPOSITIONS WITH INCREASED REINFORCING FILLER DISPERSION

(75) Inventors: William L. Hergenrother, Akron, OH (US); Anthony J. Ramic, Cuyahoga Falls, OH (US); James D. Ulmer, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 203 days.

(21) Appl. No.: 09/584,052

(22) Filed: May 30, 2000

(51) Int. Cl.⁷ .............................. C08L 97/02; C08K 3/04
(52) U.S. Cl. ........................................ 524/76; 524/495
(58) Field of Search ................................ 524/495, 496, 524/27, 35, 72, 493, 492, 76

(56) References Cited

U.S. PATENT DOCUMENTS

| | | |
|---|---|---|
| 2,850,403 A | 9/1958 | Day |
| 3,565,658 A | 2/1971 | Frazier |
| 4,102,967 A | 7/1978 | Vanderveen |
| 4,569,834 A | 2/1986 | West |
| 5,599,868 A | 2/1997 | Bohm et al. |
| 5,654,357 A | 8/1997 | Menashi et al. |
| 5,747,563 A | 5/1998 | Flenniken et al. |
| 5,872,177 A | * 2/1999 | Whitehouse ................. 524/495 |

FOREIGN PATENT DOCUMENTS

| | | |
|---|---|---|
| EP | 0 318 196 A2 * | 5/1989 |
| EP | WO 98/01503 | 1/1998 |

OTHER PUBLICATIONS

Donnet et al., *Carbon Black Physics, Chemistry and Elastomer Reinforcement*, Marcel Dekker, Inc., New York, pp. 8–13, 32 (1976).
Donnet et al., *Carbon Black Science and Technology*, Marcel Dekker, Inc., New York, pp. 27–29, 158–160 (1993).

* cited by examiner

*Primary Examiner*—Robert D. Harlan
(74) *Attorney, Agent, or Firm*—Meredith E. Palmer; Arthur M. Reginelli

(57) ABSTRACT

A polar surfactant, preferably organic, is disclosed to increase dispersion of reinforcing filler aggregates in rubber compositions. The surfactant acts on binders present in the reinforcing filler aggregates so that the surfactant associates with the water soluble binder on carbon black to increase carbon black dispersion. The polar surfactant has an hydrophilic-lipophilic balance value of about 3 to about 35. Rubber products using the composition and methods of making the composition are also disclosed.

19 Claims, 2 Drawing Sheets

RUBBER COMPOSITIONS WITH INCREASED REINFORCING FILLER DISPERSION

FIELD OF THE INVENTION

The invention relates to a rubber composition with increased dispersion of the reinforcing filler in the rubber elastomer.

BACKGROUND OF THE INVENTION

Rubber compounding refers to the process of adding various materials to the rubber polymer to achieve desirable physical and chemical properties. During compounding of a typical rubber composition, vulcanizing agents, accelerators, fillers, plasticizers and antidegradants are added to the polymer.

Dispersion of fillers and pigments involves the process of uniformly incorporating those materials into the rubber elastomer and includes reduction of their sizes. More complete dispersion results in a rubber compound having more consistent physical and chemical properties throughout the bulk of the compound, which yields a better finished product. With fillers in particular, dispersion involves the reduction of the original, large agglomerates, comprised of many individual aggregates. The original agglomerates are reduced to a combination of individual aggregates, and agglomerates much smaller than the original ones. The reduction in the size and number of agglomerates provides a better finished product.

Historically, mechanical mixing equipment, such as an open mill, an internal mixer, or a batch mixer/extruder combination, has been utilized to aid in the dispersion of fillers within the elastomer. Often the incorporation of filler into elastomer occurred by mechanical mixing which used multiple mixing stages, including masterbatching, remill, and final mixing. Alternatively, U.S. Pat. No. 5,599,868 discloses a method for mixing a rubber composition with improved properties, comprising the steps of treating a filler with liquid in the amount of 10–60% by weight to form a pre-blend, and mixing the pre-blend with at least one polymer.

SUMMARY OF THE INVENTION

The present invention solves problems in the art of reducing agglomerate sizes of a reinforcing filler in a rubber elastomer during the mixing process of rubber compounds, preferably for forming pneumatic tires.

The present invention is directed to a process for compounding polymer and filler with a polar surfactant which results in reduced overall mixing time when compared to existing compounding-mixing techniques.

More particularly, the present invention employs an organic, polar surfactant to break down the water soluble binder used in carbon black pelletization to aid in the dispersion of the carbon black into the elastomer. The properties of the organic, polar surfactant, such as its molecular weight and polarity, and the amount of surfactant in the compound, control the degree of dispersion of the reinforcing filler in the elastomer. The surfactant acts upon the water-soluble binder that otherwise hinders dispersion of the carbon black filler throughout the rubber elastomer.

One aspect of the present invention is a vulcanizable elastomer composition having approximately 100 parts by weight of a polymer, about 5 to about 100 parts by weight of a reinforcing filler per 100 parts polymer, about 0.5 to about 10 parts by weight of a polar surfactant per 100 parts polymer and about 0.5 to about 15 parts by weight of cure agents per 100 parts of said polymer.

Another aspect of the invention is a process for preparing an elastomeric composition with increased dispersion of filler in the composition, comprising the steps of (a) mixing reinforcing filler, polar surfactant and polymer to form a rubber compound; (b) curing the rubber compound to form the composition; wherein the polar surfactant has an hydrophilic-lipophilic balance value of about 3 to about 35.

Another aspect of the present invention is to provide a rubber product, comprising at least one rubber component having reinforcing filler and a polar surfactant, wherein the filler has increased dispersion in the rubber component due to the incorporation of the polar surfactant, and wherein the polar surfactant has an hydrophilic-lipophilic balance value of about 3 to about 35.

An advantage of the invention is the ability to provide fewer filler agglomerates and reduced agglomerate sizes in the rubber compound with faster processing times.

Another advantage of the invention is the utility of the invention with any rubber compound that employs carbon black as a filler, where the carbon black is delivered to the mixing chamber in a pelletized form using a water soluble binder.

EMBODIMENTS OF THE INVENTION

Figure 1:
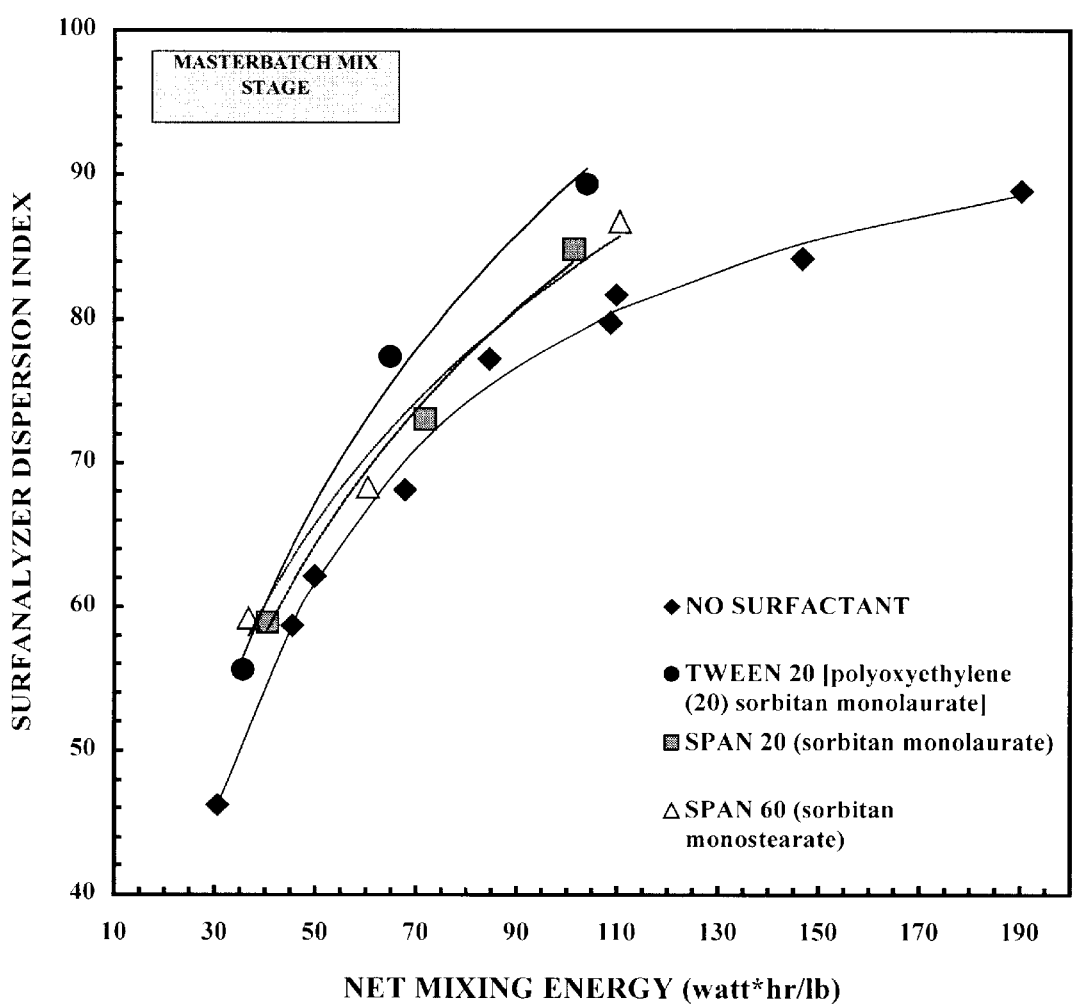
FIG. 1 is a graph of examples plotting dispersion vs. net mixing energy.
Figure 2:
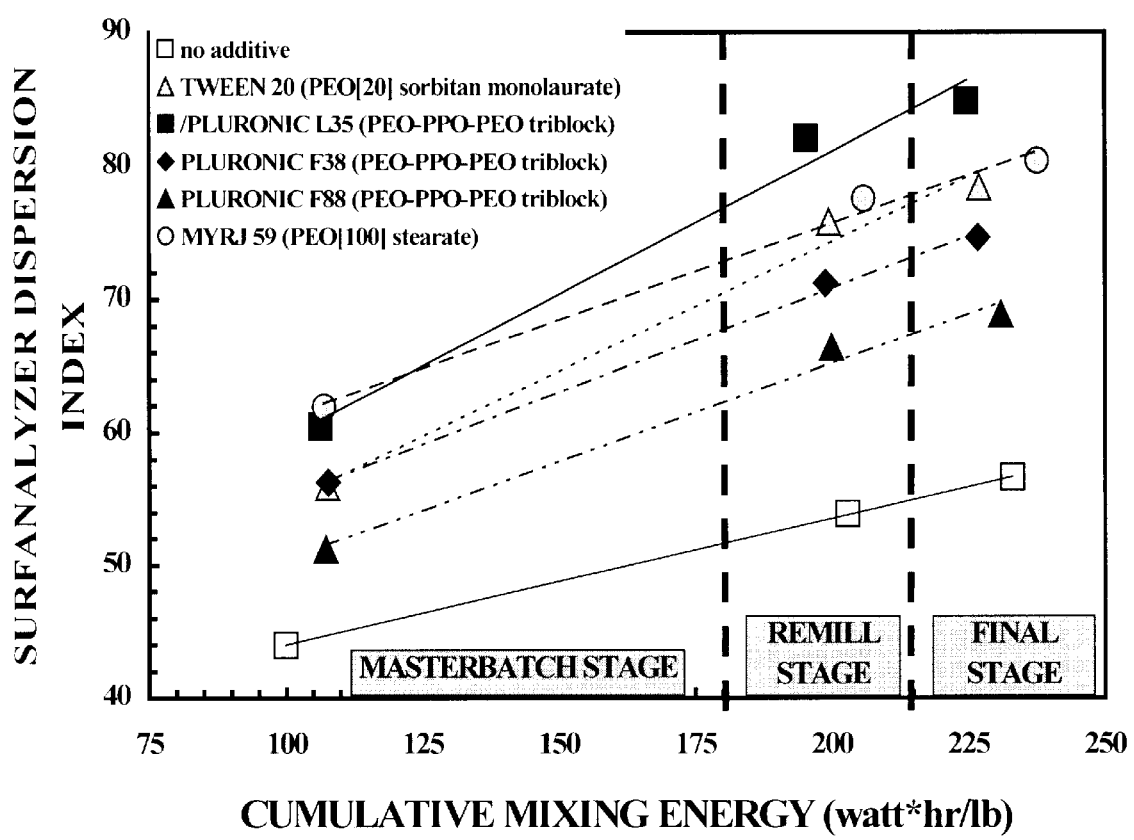
FIG. 2 is a graph of examples plotting dispersion vs. cumulative mixing energy.

The present invention improves the dispersion of fillers in polymer during mixing. Conventional rubber polymers and conventional fillers benefit from the addition of surfactants of the present invention.

Conventional Rubber Polymers

The rubber component affected by surfactants of the present invention may be a single polymer or combination of polymers. These rubbers include but are not limited to natural rubber, isoprene, styrene-butadiene, styrene-isoprene-butadiene, butadiene, butadiene-isoprene, ethylene-propylene, nitrile, acrylate-butadiene, chloro-isobutene-isoprene, nitrile-butadiene, nitrile-chloroprene, styrene-chloroprene, styrene-isoprene rubbers, and combinations thereof.

Typically, in the formulation of vulcanizable rubber compounds for tread stocks, a polymerized elastomer, e.g., polybutadiene, polyisoprene and the like, and copolymers and terpolymers thereof with monovinyl aromatics such as styrene, α-methyl styrene and the like, or trienes such as myrcene, is compounded to form the rubber stock. Thus, the elastomers include diene homopolymers, A, and copolymers and terpolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, alpha-methylstyrene, p-methylstyrene, vinyltoluenes and vinylnaphthalenes.

The conjugated diene monomer and aromatic vinyl monomer are normally used at the weight ratios of about 90:10 to about 55:45, preferably about 80:20 to about 65:35. Preferred elastomers include diene homopolymers such as polybutadiene and polyisoprene, and copolymers such as styrene butadiene rubber (SBR). Copolymers can comprise from about 99 to about 55 percent by weight of diene units and from about 1 to about 45 percent by weight of monovinyl aromatic or triene units, totaling 100 percent. The polymers and copolymers of the present invention may have 1,2-microstructure contents ranging from about 10 to about 80 percent, with the preferred polymers or copolymers having 1,2-microstructure contents of from about 25 to about 65 percent, based upon the diene content.

The molecular weight of a polymer used in the present invention, is preferably such that a proton-quenched sample will exhibit a gum Mooney viscosity ($ML_4/100°$ C.) of from about 2 to about 150. Although not limited as such, the copolymers and terpolymers are preferably random polymers which result from simultaneous copolymerization of the monomers, as is known in the art. Also included are non-functionalized cis-polybutadiene, ethylene-propylene-diene monomer (EPDM), emulsion styrene butadiene rubber, styrene isoprene butadiene rubber (SIB) and natural rubber.

The above-described copolymers and terpolymers of conjugated dienes and their method of preparation are well known in the rubber and polymer arts. Many of the polymers are commercially available. It is to be understood that practice of the present invention is not to be limited to any particular rubber included herein above or excluded.

In addition, it has also been discovered that in order to increase the bonding between the rubber and the reinforcing fillers, the rubber polymer(s) can be functionalized with various groups. These groups can be introduced during polymer initiation, as well as at termination and accordingly, it is known to provide polymers functionalized at one or both ends of the polymer chain. Examples of functionalized rubber polymers and their related methods are set forth in U.S. Pat. Nos. 5,268,439, 5,866,650 and 5,916,961. It is also known to provide functional groups along the polymer chain. In the practice of the present invention, the use of any of the foregoing or other functionalized polymers may be useful.

Conventional Fillers

Typical filler materials include reinforcing fillers normally used in rubber compounding such as carbon blacks, talcs, silica and other fine particles of mineral materials and combinations thereof. Carbon black is the most likely filler to benefit from the present invention because carbon black is often treated with a water-soluble binder to form pellets for ease of handling and sizing. Carbon black pellets can range from about 300 μm to about 3000 μm, whereas the desired size of the dispersed carbon black is the size of the individual aggregates, preferably in the range from about 20 nm to about 500 nm. The objective of conventional mixing is to reduce the size of the carbon black from pellets to agglomerates and individual aggregates while minimizing the number and size of the agglomerates. Binders inhibit such mixing effort, increasing the time and energy necessary to disperse the carbon black aggregates to an acceptable extent.

The carbon blacks of the present invention can include but are not limited to the commonly available, commercially produced carbon blacks used in rubber products such as N-110, N-220, N-343, N-339, N-330, N-351, N-472, N-550, N-660, N-880 and N-990 as designated by ASTM D-1765-99a, as well as various channel blacks, and conductive carbon blacks. Other carbon blacks which may be utilized include acetylene blacks. A mixture of two or more of the above blacks can be used in preparing the carbon black products of the invention.

The surface area of usable carbon blacks range from greater than 150 $m^2/g$ to 5 $m^2/g$. The use of a specific carbon black will vary as to the desired physical properties of the rubber compound. Each type and make of carbon black can have a different amount or type of binder, or both. Accordingly, one can alter the amount of surfactant to accomplish the goal of the present invention.

"Particle", as used in this disclosure, also referred to by those familiar with the art as "primary particles," means individual, generally spherical units, formed at the early stages of the carbon black synthesis process, which cannot be subdivided by ordinary means. Further, the term "aggregate", as used herein, refers to an accumulation of these particles that are fused together and tightly bonded. Aggregates generally cannot be broken down into individual particles through mechanical means, particularly when aggregates are being mixed with other materials in a mixing operation. The particle-particle interaction forces are generally too great to be broken. The term "agglomerate" refers to an accumulation of aggregates that are held together. Agglomerates are generally held together by weaker physical forces and can be separated by mechanical means, such as during a mixing operation.

Improved Filler Dispersion

As indicated above, carbon black fillers typically use a binder to hold the carbon black aggregates together to form a pellet, and to increase the bulk density of the filler for manufacture, storage and shipment prior to mixing and to prevent dust and other environmental effects during mixing. However, the usefulness of the binder for these reasons becomes a detriment once mixing begins because the binder can hinder dispersion of the carbon black filler in the rubber compound.

Generally, the binder in commercially available carbon black pellets will comprise from about 0.1 to about 0.5% of the total weight of the carbon black. Such binders commonly used are molasses, corn syrup, calcium lignosulfate and combinations thereof, all sharing the property of being water soluble.

While not being limited to a particular theory, the surfactants used in the present invention overcome the negative effect of the binder upon mixing and dispersion by wetting the carbon black filler to weaken the binder and make the filler more compatible with the rubber. The surfactants associate with and weaken the effect of these binders on the carbon black aggregates, which allows for increased dispersion of the carbon black within the rubber polymer. Thus, the presence of the binder is not removed. Rather it is believed that the surfactant weakens the attachment of the binder to the carbon black aggregates to improve dispersion in lipophilic rubber.

The polar surfactants of the present invention are organic surfactants, with the hydrophilic-lipophilic balance (HLB) values, as provided by the supplier, ranging from about 3 to about 35. Larger HLB values reflect increased hydrophilicity. In the present invention, surfactants with higher HLB values promote increased dispersion of the carbon black into the elastomer.

The polar surfactants of the present invention may be liquid or solid at room temperature. The molecular weights of these surfactants can range from about 100 g/mole to about 15,000 g/mole. Higher molecular weight surfactants are generally preferred to lower molecular weight ones; however for the Pluronic® block copolymers of propylene oxide and ethylene oxide (Examples 11–13, 16–19, 21–23), the higher molecular weight surfactants have been found to be less effective for increased dispersion. The rubber compound can be mixed without any prior wetting of the reinforcing filler with the polar surfactant. This advantage permits the surfactant to be added preferably during the initial masterbatch stage of mixing. Alternatively, the addition of the surfactant can occur during later stages of mixing. The surfactant is added at a level of from about 1% to about 5% of the total compound weight excluding the weight of the surfactant, with about 2% to about 4% being preferable. Further embodiments of the invention are described in the following Examples.

The composition of the present invention can be used for the production of any rubber product that benefits from increased dispersion of reinforcing fillers therein. Preferably, rubber products used in the automotive and chemical industries can benefit from this invention. Rubber tires, preferably pneumatic vehicle tires benefit from the increased dispersion of reinforcing fillers. Pneumatic tires can be made according to the constructions disclosed in U.S. Pat. Nos. 5,866,171; 5,876,527; 5,931,211; and 5,971,046, the disclosures of which are incorporated herein by reference.

EXAMPLES

Properties of the experimental rubber compounds were tested in accordance with the following methods.

General Experimental Testing Procedures

1. Dispersion

In the present invention, carbon black dispersion was measured generally according to ASTM D2663, Test Method C (1995), except the same calibration values, A and B, were used for all test samples with periodic review of the calculated dispersion ratings relative to dispersion estimates from light optical microscopy. This test method utilizes a dispersion analyzer comprised of a stylus microroughness measurement device, a specimen holder, sample cutter and specimen-mounting device. A vulcanized rubber sample is cut with a razor blade and the cut surface is traced with a stylus which measures surface roughness caused by undispersed carbon black. The measured roughness of the rubber surface is expressed by a dispersion index, based on a scale of 0 to 100. The scale is relative to a maximum value which represents 100% of the carbon black agglomerates having a size of less than about 10 $\mu$m. For the present invention, specimens for dispersion index measurements are discs about 2.54 cm in diameter and about 3.2 mm thick before cutting. When the rubber contains curatives, the dispersion specimens were heat vulcanized under pressure in a mold with multiple cavities of the desired disc shape. Cure was effected with the filled mold placed in a press held at elevated temperature and under 20 tons (18,182 kg) of ram force, for a time required to provide an adequate cure, after which the specimens were quenched in cold water for five minutes. When the rubber does not contain curatives, dispersion index specimens were compression molded between Mylar brand plastic sheets to the desired shape for 30 minutes at a temperature of 105° C. and cooled to room temperature under 20 tons of ram force. The molded specimens are subsequently cured by irradiation at an exposure of approximately 10 to 11.5 Mrad per side to provide an adequate cure.

2. Vulcanization using Oscillating Disk Cure Meter

In the present invention, cure is measured utilizing an oscillating disk cure meter according to ASTM D2084 (1995). A sample of vulcanizable rubber is inserted into the test cavity of the cure meter, which is then sealed and kept under pressure. The cavity is kept at a constant vulcanization temperature. A disk is oscillated, exerting a shear strain on the rubber sample. The force required to oscillate the disk is continuously recorded as a function of time.

3. Mooney Scorch

In the present invention, Mooney Scorch is measured according to ASTM D1646 (1999). An unvulcanized rubber sample is placed between sheets of cellophane and inserted into the sample cavity of the Mooney Shear Viscometer. A disc shaped rotor rotates inside of the flat cylindrical heated cavity. The resistance of the rubber to the rotation of the rotor corresponds to a torque. Mooney Scorch is the time from the end of a preheat to a 5 point torque rise over the minimum torque at 130° C.

4. Shore A Hardness

In the present invention, Shore A Hardness is measured generally according to ASTM D2240 (1997). A Shore A durometer is pressed into the vulcanized rubber sample and after a specified amount of time the resistance to this pressure is measured in durometer units.

5. Modulus, Tensile Strength and Elongation at Break

Modulus, Tensile Strength (Stress at Maximum Strain) and Elongation at Break are measured generally according to ASTM D 412 (1998) method B. Vulcanized rubber test specimens are cut into the shape of ring, using a D412 B Type 1 die. The measurements for the above properties are based on the original cross sectional area of the test specimen. An instrument equipped to produce a uniform rate of grip separation, such as an Instron, with a suitable dynamometer and an indicating or recording system for measuring applied force is used in conjunction with a measurement of extension of the test specimen. Modulus, tensile strength and elongation are calculated according to the calculations set forth in ASTM D412 (1998).

6. Lambourn Abrasion

For the present invention, Lambourn Abrasion is used to measure the rate of abrasion of tread compounds, compared to relevant control compounds. Test specimens are rubber wheels of about 48 mm in outside diameter, about 22 mm in inside diameter and about 4.8 mm in thickness. The wheels can be prepared by following two methods.

In the first method, the rubber compound is molded to the wheel dimensions during curing. In the second method, a rectangular rubber slab is cured, then wheels of the proper dimensions are cut from the slab using a rotary saw. During cutting, the rubber is lubricated with a mixture of soap and water. In the later case, the wheels are wiped with a cloth after cutting, and allowed to air dry before testing.

Abrasion is induced by rotating the rubber wheel, mounted on an axle, against a counter rotating drum with a diameter of about 173 mm. An abrading surface, 120 grit 3M-ite, is adhered to the circumferential surface of the drum, normal to the drum radius. A load of about 2.5 kg (2 kg weight plus 0.5 kg for the fixture holding the weight) is applied to the rubber wheel during testing. Typically, the rubber wheels are tested at a slip of 65%, which is the difference in tangential velocities of the rubber wheel and the drum, divided by the tangential velocity of the rubber wheel, all multiplied by 100%, and where the tangential velocity of the rubber wheel is based on the rubber wheel diameter before abrasion.

Talc is applied during testing to the region where the rubber wheel and abrading surface meet. The talc flow rate is nominally 0.4 grams per minute. The abrading surface is preconditioned prior to the application of the experimental compounds. Preconditioning consists of testing six wheels of a typical tread compound at the conditions above for 50 seconds for each wheel.

After the preconditioning step, a total of about 150 experimental compound wheels and appropriate control compound wheels can be tested against the same abrading surface, at which time the abrading surface is replaced. The new abrading surface is also preconditioned before testing experimental and control compounds. Abrasion rates are determined for the rubber wheels by periodically measuring the weight loss as a function of abrading time. Typically, the total test time is about 75 seconds. A linear, least squares curve-fit is applied to the weight loss data as a function of time. The slope of the line is the abrasion rate. The reported abrasion index is one-hundred multiplied times the control compound abrasion rate divided by the experimental compound abrasion rate. Thus, an abrasion index greater than 100 indicates that the experimental compound is better (abrades at a lower rate) than the control compound.

7. Ring Tear

Tear characteristics of rubber compounds are measured using a tensile tester, capable of maintaining a constant temperature in the sample chamber. Cured test specimens of approximately 2.54 mm thickness are cut into rings with an inner diameter of about 4.44 cm and an outer diameter of about 5.72 cm. A partial cut is made in the ring in the radial direction with a razor blade. Tear is then measured as the force per unit thickness necessary to rupture the notched ring with the above dimensions.

8. Tangent Delta

Tangent delta is a dynamic mechanical property of rubber compounds. Tangent delta is measured using a Dynastat Viscoelastic Analyzer. Testing conditions specific to the data reported herein are 1 Hz, 2 kg static mass and 1.25 kg dynamic load, and the specimen is a vulcanized rubber cylinder nominally 9.5 mm in diameter and 16 mm high.

Examples 1–9 and Comparison Examples A–I

The following examples offer a direct comparison between the carbon black dispersion observed in an unmodified tire tread stock and three modified tire tread stocks, each of the three containing different polar surfactants, with further comparison of carbon black dispersion at varied mixing energies employed during the mixing of the four different types of tread stocks. The commercially available surfactants are identified in Table 1 and were chosen for their variety of polarities as expressed in HLB values.

TABLE 1

| Surfactant Type | Surfactant Trade Name (All from ICI Americas, Inc.) | Generic Name | Surfactant Molecular Weight (g/mole) | HLB Value |
|---|---|---|---|---|
| Examples 1–3 | Tween ®20 | Polyoxyethylene (20) Sorbitan Monolaurate | 1228 | 16.7 |
| Examples 4–6 | Span ®20 | Sorbitan Monolaurate | 346.47 | 8.6 |
| Examples 7–9 | Span ®60 | Sorbitan Monostearate | 430.63 | 4.7 |

The recipes for the four tread stocks used in Examples A–I and 1–9 are presented in Table 2.

TABLE 2

| Material (in Parts) | Examples A–I | Examples 1–3 | Examples 4–6 | Examples 7–9 |
|---|---|---|---|---|
| Masterbatch Stage: | | | | |
| Chain-end functional SBR | 70.0 | 70.0 | 70.0 | 70.0 |
| Natural Rubber | 30.0 | 30.0 | 30.0 | 30.0 |
| Carbon Black, N343 | 41.0 | 41.0 | 41.0 | 41.0 |
| Antioxidant | 0.95 | 0.95 | 0.95 | 0.95 |
| Wax Blend | 1.0 | 1.0 | 1.0 | 1.0 |
| Zinc Oxide | 2.5 | 2.5 | 2.5 | 2.5 |
| Stearic Acid | 2.0 | 2.0 | 2.0 | 2.0 |
| Naphthenic Oil | 8.34 | 8.34 | 8.34 | 8.34 |
| Aromatic Oil | 2.08 | 2.08 | 2.08 | 2.08 |

TABLE 2-continued

| Material (in Parts) | Examples A–I | Examples 1–3 | Examples 4–6 | Examples 7–9 |
|---|---|---|---|---|
| (high viscosity) Polar Surfactant | 0.0 | 3.0 | 3.0 | 3.0 |
| Subtotal, Masterbatch | 157.87 | 160.87 | 160.87 | 160.87 |
| Final Stage: | | | | |
| Sulfur | 1.3 | 1.3 | 1.3 | 1.3 |
| Accelerators | 1.9 | 1.9 | 1.9 | 1.9 |
| Total Parts | 161.07 | 164.07 | 164.07 | 164.07 |

All stocks from Table 2 were mixed individually in a Brabender batch mixer with a batch mass of 280 grams and a rotor speed of 40 rpm. For all of these stocks, the following masterbatch mixing procedure was used:

TABLE 3

| Time (sec) | Action |
|---|---|
| 0 | Finish charging polymer |
| 30 | Gradually add carbon black, pigments, oil |
| Varied (time required to reach 140° C.) | Dump Batch |

The mixing energy was varied by controlling the mixing time, and was measured through the use of a torque integrator which was attached to the mixer. The mixing times and energies for each of the Examples is set forth in Table 4.

TABLE 4

| System | Mixing Energy (watt-hour/2.2 kg) | Mixing Time (s) |
|---|---|---|
| A | 31 | 150 |
| B | 45 | 204 |
| C | 50 | 229 |
| D | 68 | 296 |
| E | 85 | 365 |
| F | 109 | 465 |
| G | 110 | 473 |
| H | 147 | 635 |
| I | 190 | 816 |
| 1 | 36 | 177 |
| 2 | 65 | 299 |
| 3 | 104 | 474 |
| 4 | 40 | 197 |
| 5 | 72 | 328 |
| 6 | 102 | 459 |
| 7 | 37 | 178 |
| 8 | 60 | 276 |
| 9 | 111 | 444 |

Carbon black dispersion of masterbatch specimens were prepared and tested according to the Test Method listed above. The molded discs masterbatch rubber were cured by irradiation at an exposure of approximately 9.9 MRad per side of the disc for Comparison Examples A–C and approximately 11.4 MRad for Examples 1–9. The difference in radiation occurred due to day-to-day variations in the radiation unit, but was not significant for the goal of providing a thoroughly cured sample. Carbon black dispersion results are set forth in Table 5.

TABLE 5

| Example | Average Surfanalyzer Dispersion Index | Std. Deviation of Average (n = 5) |
|---|---|---|
| A | 46.2 | 2.0 |
| B | 58.7 | 1.1 |
| C | 62.1 | 1.2 |
| D | 68.1 | 0.7 |
| E | 77.2 | 1.0 |
| F | 79.8 | 1.6 |
| G | 81.7 | 0.9 |
| H | 84.2 | 1.0 |
| I | 88.8 | 0.9 |
| 1 | 55.6 | 2.7 |
| 2 | 77.4 | 1.2 |
| 3 | 89.3 | 1.7 |
| 4 | 58.9 | 0.9 |
| 5 | 73.0 | 1.2 |
| 6 | 84.8 | 0.6 |
| 7 | 59.2 | 1.3 |
| 8 | 68.3 | 1.1 |
| 9 | 86.8 | 1.4 |

From Table 5, dispersion at all mixing energies, and FIG. I, plot of dispersion versus mixing energy, it can be seen that the incorporation of the polar surfactant results in improved carbon black dispersion. Dispersion at all mixing energies is improved with the addition of the polar surfactant. Specifically, at intermediate mixing energies, Examples D–E, 2, 5, and 8, Tween®20 surfactant (Example 2) appears to improve dispersion relative to the unmodified control (Comparison Example D) by approximately 9% (77.4 vs. 68.1). Improvement in dispersion was more pronounced at high mixing energies. Comparing Examples F–I, 3, 6, and 9, all three surfactants improve dispersion relative to the Comparison Examples, with Tween®20 surfactant (Example 3 and having the highest HLB value of the three surfactants), exhibiting the most significant improvement. These trends suggest that polar surfactants do indeed assist in promoting carbon black dispersion, and that the relative improvement among the choice of surfactants is affected by the hydrophilicity of the surfactant, with increased hydrophilicity providing the best results.

Examples 10–24 and Comparison Examples J–L

These examples provide a comparison between the carbon black dispersion observed in unmodified tire tread stocks (Comparison Examples J–L) and several modified tread stocks (Examples 10–24), with each of the modified stocks incorporating the best surfactant from Examples 1–9 along with four other surfactants having comparable or greater HLB values. The list of surfactants used in Examples 10–24 and structural information regarding these surfactants is set forth in Table 6. These experiments differ from those described in Examples 1–9 in that processing conditions were employed which more closely simulated those utilized in the large scale Banbury mixers used in tire manufacturing.

TABLE 6

| Examples | Surfactant Trade Name | Generalized Surfactant Structure* | Surfactant Molecular Weight (g/mole) | HLB value |
|---|---|---|---|---|
| 10, 15, 20 | Tween ®20 (ICI Americas) | PEO(20) sorbitan monolaurate | 1228 | 16.7 |
| 11, 16, 21 | Pluronic ®L35 (BASF) | $PEO_{11}$-$PPO_{16}$-$PEO_{11}$ | 1900 | 19 |
| 12, 17, 22 | Pluronic ®F38 (BASF) | $PEO_{43}$-$PPO_{16}$-$PEO_{43}$ | 4700 | 31 |
| 13, 18, 23 | Pluronic ®F88 (BASF) | $PEO_{104}$-$PPO_{40}$-$PEO_{104}$ | 11400 | 28 |
| 14, 19, 24 | Myrj ®59 (ICI Americas) | PEO(100) stearate | 4674 | 19 |

PEO denotes a poly(ethylene oxide) chain segment [$CH_2CH_2O$].
PPO denotes a poly(propylene oxide) chain segment [$CH_2CH_2CH_2O$].
*Estimated from Publications of the Commercial Supplier The rubber formulations used in Examples 10–24 and Comparison Examples J–L are those listed in Table 2, except that the surfactants were substituted from those of Table 1 with those of Table 6. All experiments in Examples 10–24 and Comparison Examples J–L, were mixed in a BR Banbury batch mixer with a masterbatch mass of 1300 grams and a final batch mix of 1200 grams. The rotor speed was increased from 77 RPM to 116 RPM during the mixing procedure detailed in Table 7.

TABLE 7

| Conditions | Action |
|---|---|
| Masterbatch Mix Stage: | |
| t = 0 secs. (T = 65–75° C.) | Add polymer, carbon black, pigments (except stearic acid), oil at a rotor speed of 77 RPM |
| t = 50 secs. | Sweep ram, add stearic acid, increase rotor speed to 116 RPM |
| T = 150° C. | Sweep ram |
| T = 165–171° C. | Dump batch |
| Remill Mix Stage: | |
| t = 0 secs.(T = 62–78° C.) | Add masterbatch mix product at a rotor speed of 77 RPM |
| t = 60–105 secs. | Increase rotor speed to 116 RPM |
| T = 165–166° C. | Dump batch |
| Final Mix Stage: | |
| t = 0 secs. (T = 69–74° C.) | Add remill mix product and vulcanization pigments at a rotor speed of 77 RPM |
| T = 105° C. | Dump batch |

Carbon black dispersion specimens were prepared and tested according to the Test Method listed above. Masterbatch and remill mixes (Examples 10–19, and Comparison Examples J–L) were irradiated to an exposure of approximately 10.5 MRad per side of the disc. For the final mix product, the carbon black dispersion discs were heat cured at a temperature of 165° C. for 13 minutes. Carbon black dispersion for each of the Examples are set forth in Table 8.

TABLE 8

| System | Cumulative Mixing Energy (watt-hour/ 2.2 kg) | Mixing Time (s) | Average Surfanalyzer Dispersion Index | Std. Deviation of Average (n = 5) |
|---|---|---|---|---|
| Masterbatch Stage | | | | |
| J | 100 | 168 | 44.0 | 1.1 |
| 10 | 108 | 180 | 56.0 | 2.1 |
| 11 | 106 | 180 | 60.5 | 1.3 |
| 12 | 108 | 190 | 56.3 | 0.8 |
| 13 | 108 | 180 | 51.2 | 0.9 |

TABLE 8-continued

| System | Cumulative Mixing Energy (watt-hour/ 2.2 kg) | Mixing Time (s) | Average Surfanalyzer Dispersion Index | Std. Deviation of Average (n = 5) |
|---|---|---|---|---|
| 14 Remill Stage | 107 | 190 | 61.9 | 2.1 |
| K | 203 | 171 | 53.9 | 0.3 |
| 15 | 200 | 166 | 75.8 | 1.5 |
| 16 | 195 | 169 | 82.1 | 2.1 |
| 17 | 199 | 170 | 71.2 | 2.3 |
| 18 | 200 | 173 | 66.4 | 1.2 |
| 19 Final Stage | 206 | 185 | 77.5 | 0.7 |
| L | 233 | 64 | 56.7 | 1.9 |
| 20 | 227 | 62 | 78.4 | 2.7 |
| 21 | 225 | 61 | 84.9 | 1.7 |
| 22 | 227 | 59 | 74.6 | 1.6 |
| 23 | 231 | 64 | 68.9 | 0.9 |
| 24 | 238 | 70 | 80.4 | 1.4 |

As can be seen from Table 8, and FIG. II, plot of dispersion versus cumulative mixing energy, introduction of the polar surfactant resulted in a substantial increase in carbon black dispersion relative to the control system at all levels of mixing energy. The largest improvements in dispersion were achieved with Myrj®59 (Examples 14, 19 and 24) and Pluronic®L35 (Examples 11, 16 and 21). When the range of Pluronic® surfactants was investigated (Examples 1–13, 16–18, 21–23), the results show that although the higher molecular weight Pluronic®F38 (HLB=31) and Pluronic®F88 (HLB=28) both have higher polarity indices than does Pluronic®L35 (HLB=19), the relative improvement in carbon black dispersion was diminished. Thus it appears that the molecular weight of the polar surfactant plays a role in the relative improvement in dispersion, with higher molecular weight surfactants being less effective for a particular molecular structure.

In addition to the increase in dispersion observed in each of the surfactant-modified systems, there is a change in the kinetics of the curing process, as displayed in Table 9. For the final mix-stage compounds, Mooney Scorch and Rheometer Cure are indicative of the kinetics of the curing process by describing the vulcanization of the rubber compound as a function of time and temperature. Mooney Scorch and Rheometer Cure are measured according to the test methods detailed above.

TABLE 9

| System | L | 20 | 21 | 22 | 23 | 24 |
|---|---|---|---|---|---|---|
| Polar Surfactant | none | Tween® 20 | Pluronic® L35 | Pluronic® F38 | Pluronic® F88 | Myrj® 59 |
| Rheometer Cure (171° C.) | | | | | | |
| $t_{90}$(min.) | 3.35 | 2.26 | 2.62 | 2.38 | 1.71 | 2.29 |
| Mooney Viscosity | | | | | | |
| ML ¼/130° C. | 41.4 | 40.6 | 37.6 | 42.6 | 44.1 | 42.8 |
| Mooney Scorch (130° C.) | | | | | | |
| $t_{scorch}$ (min.) | 18.25 | 4.51 | 5.16 | 4.52 | 4.16 | 4.34 |

In general, the polar surfactants decreased Mooney Scorch and $t_{90}$. Both Mooney Scorch and $t_{90}$ may be altered through the adjustment of the curatives in the rubber compound.

TABLE 10

| System | L | 20 | 21 | 22 | 23 | 24 |
|---|---|---|---|---|---|---|
| Polar Surfactant | none | Tween® 20 | Pluronic® L35 | Pluronic® F38 | Pluronic® F88 | Myrj® 59 |
| Ring Tensile | | | | | | |
| 300% modulus (psi) | 1259 | 1178 | 1150 | 1272 | 1212 | 1160 |
| Elongation at Break (%) | 478 | 470 | 475 | 402 | 489 | 455 |
| Tensile Strength (psi) | 2783 | 2568 | 2572 | 2414 | 2786 | 2376 |
| Ring Tear | | | | | | |
| Tear Strength (lbs/in) | 103 | 121 | 123 | 112 | 116 | 112 |
| Lambourn Abrasion | | | | | | |
| Abrasion Index | 100 | 102 | 107 | 105 | 104 | 107 |
| Dynastat (1 Hz) | | | | | | |
| tan δ at 50° C. | 0.087 | 0.092 | 0.089 | 0.087 | 0.089 | 0.089 |

Table 10 further displays physical properties of the unmodified and surfactant modified final mix-stage tread compounds, where the components were first heat cured at a temperature of 165° C. for 13 minutes. Generally, the addition of the surfactants (Examples 20–24) provided improved tear strength and Lambourn abrasion corresponding to improved carbon black dispersion (Table 8), in comparison to the control (Comparison Example L).

Examples 25–26 and Comparison Example M

These Examples offer a comparison of final mix-stage carbon black dispersion, vulcanized physical properties and cure properties (rheometer cure and Mooney Scorch) observed in unmodified tire tread stock, tread stock modified by the addition of a polar surfactant, and tread stock modified by the replacement of equivalent parts of naphthenic oil with polar surfactant (Table 11). Pluronic®L35 was the polar surfactant used for these Examples. The recipes for the three tread stocks used in Examples M, 25 and 26 are presented in Table 11. All of these examples were mixed in a BR Banbury, according to the mixing procedure outlined in Table 7.

TABLE 11

| Material (in Parts) | Example M | Example 25 | Example 26 |
|---|---|---|---|
| Masterbatch Stage: | | | |
| Chain-end functional SBR | 70.0 | 70.0 | 70.0 |
| Natural Rubber | 30.0 | 30.0 | 30.0 |
| Carbon Black, N343 | 41.0 | 41.0 | 41.0 |
| Antioxidant | 0.95 | 0.95 | 0.95 |
| Wax Blend | 1.0 | 1.0 | 1.0 |
| Zinc Oxide | 2.5 | 2.5 | 2.5 |
| Stearic Acid | 2.0 | 2.0 | 2.0 |
| Naphthenic Oil | 8.34 | 8.34 | 5.34 |

TABLE 11-continued

| Material (in Parts) | Example M | Example 25 | Example 26 |
|---|---|---|---|
| Aromatic Oil (high viscosity) | 2.08 | 2.08 | 2.08 |
| Polar Surfactant | 0.0 | 3.0 | 3.0 |
| Subtotal, Masterbatch | 157.87 | 160.87 | 157.87 |
| Final Stage: | | | |
| Sulfur | 1.3 | 1.3 | 1.3 |
| Accelerators | 1.9 | 1.9 | 1.9 |
| Total Parts | 161.07 | 164.07 | 161.07 |

For Examples M, 25 and 26, final mix-stage carbon black dispersion and cured physical property specimens were vulcanized at a temperature of 165° C. for 13 minutes. All properties of these final mix-stage compounds were tested according to the Test Methods listed above, and the results are set forth in Table 12.

TABLE 12

| System | M | 25 | 26 |
|---|---|---|---|
| Polar Surfactant | none | Pluronic ®L35 | Pluronic ®L35 |
| Dispersion Index | | | |
| Final | 56.3 | 78.4 | 88.3 |
| Rheometer Cure (165° C.) | | | |
| $t_{90}$(min.) | 4.33 | 3.80 | 3.97 |
| Mooney Viscosity | | | |
| ML ¼/130° C. | 44.6 | 41.2 | 46.3 |
| Mooney Scorch (130° C.) | | | |
| $t_{scorch}$ (min.) | 15.57 | 5.37 | 4.93 |
| Ring Tensile (23° C.) | | | |
| 300% modulus (psi) | 1213 | 1080 | 1304 |
| Elongation at Break (%) | 451 | 509 | 474 |
| Stress at Max. Strain (psi) | 2424 | 2638 | 2813 |
| Ring Tear | | | |
| Tear Strength (lbs/in) | 113 | 121 | 139 |
| Hardness (Shore A) | | | |
| 3.0 sec (23° C.) | 56.0 | 53.3 | 55.9 |
| Lambourn Abrasion | | | |
| Abrasion Index | 100 | 104 | 106 |
| Dynastat (1 Hz) | | | |
| tan δ at 50° C. | 0.102 | 0.107 | 0.108 |
| M' at 25° C. (MPa) | 6.21 | 5.83 | 6.37 |

As can be seen from the results in Table 12, adding Pluronic® L35 above formulation (Example 25) serves to soften the compound relative to the control (Comparison Example M), as seen by hardness, 300% modulus and Dynastat dynamic modulus data. Additionally, Mooney Viscosity of the uncured rubber is reduced.

Replacing oil with an equivalent amount of Pluronic® L35—(Example 26) restores harness, 300% modulus and Dynastat Dynamic modulus to levels comparable to the control (Comparison Example M) In both of the surfactant modified compounds (Examples 25 and 26), carbon black dispersion is improved in comparison to the control (Comparison Example M). In addition, corresponding to the improvement in carbon black dispersion, tear strength, tensile strength and Lambourn abrasion are also improved versus the control compound (Comparison Example M).

The invention is not limited to the above embodiments. The claims follow.

What is claimed is:

1. A vilcanizable elastomer composition comprising:
   a polymer;
   about 5 to about 100 parts by weight of reinforcing filler per 100 parts said polymer;
   about 0.5 to about 10 parts by weight of a polar surfactant per 100 parts of said polymer;
   about 0.5 to about 15 parts of cure agent per 100 parts of said polymer; and
   a water-soluble binder.

2. The composition of claim 1, wherein the reinforcing filler is selected from the group consisting of carbon black, talc, silica, and combinations thereof.

3. The composition of claim 2, wherein the reinforcing filler comprises carbon black.

4. The composition of claim 3, wherein the size of the carbon black aggregates is about 20 nm to about 500 nm.

5. The composition of claim 3, wherein the surface area of the carbon black aggregates is about 150 $m^2$/gm to about 5 $m^2$/gm.

6. The composition of claim 1, wherein the water soluble binder is selected from the group consisting of molasses, corn syrup, calcium lignosulfate, and combinations thereof.

7. The composition of claim 1, wherein the polar surfactant is an organic compound.

8. The composition of claim 7, wherein the polar surfactant has a molecular weight of about 100 g/mole to about 15,000 g/mole.

9. The composition of claim 1, wherein the polar surfactant has an hydrophilic-lipophilic balance value of about 3 to about 35.

10. The composition of claim 1, wherein the polar surfactant is in the composition at a level of about 1 to about 5 weight percent of the total weight of the composition.

11. The composition of claim 1, wherein the rubber component is functionalized or unfunctionalized and is selected from the group consisting of natural rubber, isoprene, styrene-butadiene, styrene-isoprene-butadiene, butadiene, butadiene-isoprene, ethylene-propylene, nitrile, acrylate-butadiene, chloro-isobutene-isoprene, nitrile-butadiene, nitrile-chloroprene, styrene-chloroprene, styrene-isoprene rubbers, and combinations thereof.

12. A vulcanizable elastomer composition produced by a process comprising the step of:
   mixing 100 parts by weight of a polymer, about 0.5 to about 10 parts by weight of a polar surfactant per 100 parts of the polymer, about 5 to about 100 parts by weight of a carbon-black per 100 parts of the polymer, where the carbon black filler is bound by a water-soluble binder, and about 0.5 to about 15 parts by weight of cure agents per 100 parts of the polymer.

13. A vulcanizate produced by a process comprising the steps of:
   mixing 100 parts by weight of a polymer, about 0.5 to about 10 parts by weight of a polar surfactant per 100 parts of the polymer, about 5 to about 100 parts by weight of a carbon-black per 100 parts of the polymer, where the carbon black filler is bound by a water-soluble binder, and about 0.5 to about 15 parts by weight of cure agents per 100 parts of the polymer; and
   curing the mixture.

14. A vulcanizate comprising:
   a rubber;
   about 5 to about 100 parts by weight of reinforcing filler per 100 parts of the cured rubber;

about 0.5 to about 10 parts by weight of a polar surfactant per 100 parts of the cured rubber; and a water-soluble binder.

15. The rubber product of claim 1, wherein the rubber product is a tire and wherein the rubber component is a tread.

16. The rubber product of claim 1, wherein the reinforcing filler comprises carbon black.

17. The rubber product of claim 1, wherein the polar surfactant is an organic compound and wherein the polar surfactant has a molecular weight of about 100 g/mole to about 15,000 g/mole.

18. The vulcanizate of claim 14, where the vulcanizate is a tire component.

19. The rubber product of claim 16, where said carbon black is dispersed throughout said rubber, and where the level of dispersion is increased as a result of said polar surfactant and said water-soluble binder.

* * * * *